US009161292B2

(12) United States Patent
DeLuca et al.

(10) Patent No.: US 9,161,292 B2
(45) Date of Patent: *Oct. 13, 2015

(54) PROPRIETARY RADIO CONTROL HEAD WITH AUTHENTICATION

(71) Applicant: Sirius XM Radio Inc., New York, NY (US)

(72) Inventors: Michael J. DeLuca, Boca Raton, FL (US); Paul Kelley, Boca Raton, FL (US); Nitesh Singhal, Deerfield Beach, FL (US)

(73) Assignee: Sirius XM Radio Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/094,920

(22) Filed: Dec. 3, 2013

(65) Prior Publication Data

US 2014/0194070 A1 Jul. 10, 2014

Related U.S. Application Data

(63) Continuation of application No. 11/281,783, filed on Nov. 16, 2005, now Pat. No. 8,606,231.

(51) Int. Cl.
| | | |
|---|---|---|
| *H04M 1/68* | (2006.01) | |
| *H04W 48/10* | (2009.01) | |
| *H04H 60/73* | (2008.01) | |
| *H04H 60/80* | (2008.01) | |
| *H04H 60/23* | (2008.01) | |

(52) U.S. Cl.
CPC .............. *H04W 48/10* (2013.01); *H04H 60/73* (2013.01); *H04H 60/80* (2013.01); *H04H 60/23* (2013.01)

(58) Field of Classification Search
CPC . H04N 21/84; H04N 21/8456; H04N 21/435; H04N 21/44209; H04N 21/4126; H04N 21/6181; H04N 5/44543; H04N 13/0066; H04N 21/6405; H04N 21/6408; H04L 67/2842; H04L 65/60; H04L 65/607; H04L 65/80
USPC ......... 455/68, 411, 419, 436.1; 370/328, 331; 725/44, 46, 47
See application file for complete search history.

(56) References Cited

U.S. PATENT DOCUMENTS

| | | | |
|---|---|---|---|
| 3,365,542 A | 1/1968 | Banning, Jr. | |
| 4,525,865 A | 6/1985 | Mears | |
| 4,887,311 A | 12/1989 | Garner et al. | |
| 4,903,262 A | 2/1990 | Dissosway et al. | |
| 4,941,174 A | 7/1990 | Ingham | |

(Continued)

*Primary Examiner* — Nimesh Patel
(74) *Attorney, Agent, or Firm* — Kramer Levin Naftalis & Frankel LLP

(57) ABSTRACT

A combination of a radio receiver with a detachable controller is presented. The radio receiver sends either reduced or enhanced metadata about received programming to the controller. A connection from the controller to the receiver carries commands and carries only the reduced set of metadata, such as tuned channel and tuned channel name, from the radio receiver back to the controller. The controller is authorized by the radio receiver sending a radio identifier to the controller, determination of an authentication code at the controller and communication of the determined authentication code back to the radio receiver for validation. Upon validation, an enhanced set of metadata, including song title and artist, is sent to the controller. The enhanced metadata, the reduced metadata, or both, may be encrypted. Such authorization processing is periodically performed by the radio receiver.

20 Claims, 9 Drawing Sheets

(56) References Cited

U.S. PATENT DOCUMENTS

| | | |
|---|---|---|
| 5,023,936 A | 6/1991 | Szczutkowski et al. |
| 5,109,286 A | 4/1992 | West, Jr. et al. |
| 5,499,295 A | 3/1996 | Cooper |
| 6,226,618 B1 * | 5/2001 | Downs et al. .......... 705/51 |
| 6,611,755 B1 | 8/2003 | Coffee et al. |
| 6,859,466 B1 | 2/2005 | Chen et al. |
| 8,606,231 B2 * | 12/2013 | De Luca et al. .......... 455/411 |
| 2003/0027555 A1 | 2/2003 | Malackowski et al. |
| 2004/0116070 A1 | 6/2004 | Fishman et al. |
| 2004/0185777 A1 | 9/2004 | Bryson |
| 2004/0266336 A1 | 12/2004 | Patsiokas et al. |
| 2005/0074024 A1 | 4/2005 | Kim et al. |
| 2005/0100161 A1 | 5/2005 | Husemann et al. |
| 2006/0221173 A1 * | 10/2006 | Duncan .......... 348/14.02 |

* cited by examiner

US 9,161,292 B2

PROPRIETARY RADIO CONTROL HEAD WITH AUTHENTICATION

This application is a continuation of U.S. application Ser. No. 11/281,783 filed Nov. 16, 2005.

BACKGROUND OF THE INVENTION

1. Field of the invention

This invention generally relates to user interface/device controllers for radio receivers and more specifically 10 radio receiver controllers that perform authentication with the controlled radio receiver.

2. Description of Related Art

Radio receivers are sometimes designed to support separate controllers, often referred to as control heads, that allow a user to enter control commands for the receiver. These separate controllers also often display data produced by or related to the radio, such as the currently tuned channel information, volume setting, received signal strength, and other radio operating information. Control heads are also able to display other data produced by a receiver that it is controlling, such as programming metadata received by the receiver. One example of such programming metadata is provided by subscription satellite radio services, such as Satellite Digital Audio Radio Service (SDARS) that include Systems operated by Sirius Satellite Radio, Incorporated and XM Satellite Radio Holdings, Incorporated. These subscription satellite radio services broadcast metadata that includes the song title and song artist for a song currently being played on the currently tuned channel of the subscription radio receiver. The use of separate controllers enhances the flexibility in mounting for the radio receiver and the separate controller. An example of one advantage is liar installations of radio receivers in a motor vehicle. In a motor vehicle installation, the separate controller has ad much smaller size than the entire radio receiver and can be mounted more conveniently and in a manner that consumes much less space. The radio receiver in such an installation can be mounted anywhere in the vehicle that can accommodate its space and power requirements. A further example of the advantageous use of separate controllers is the use of wireless controllers that allow users to freely pass around and use the wireless controller anywhere within wireless range of the radio receiver.

Manufacturers of radio receivers also produce the separate controllers that are used to control those radios. The radio receiver and the separate controller generally communicate over a wired or wireless data link that allows the exchange of control commands for the radio receiver and data provided by the radio receiver that is to be displayed on the separate controller. The use of a conventional data link for the connection between the radio receiver and the separate controller allows a third party to determine the characteristics of that connection and manufacture substitute separate controllers. The presence of unauthorized third party separate controllers may facilitate unauthorized duplication of copyrighted radio content and further deprives the manufacturer of the radio receiver of control over the appearance presented to a user of the radio receiver, and therefore limits the enthusiasm of manufacturers to support and provide separate controllers for their radio receivers and deprives the public of their benefits. Incorporating conventional data security processes in the radio receiver and the separate controller would unduly add to the complexity of these devices.

Therefore a need exists to overcome the problems with the prior art as discussed above.

SUMMARY OF THE INVENTION

Briefly, in accordance with the present invention, an automated method on a control device for authenticating the control device to a radio receiver being controlled includes establishing a connection from a control device to a radio receiver. The connection communicates commands from the control device to the radio receiver and communicates a reduced set of metadata from the radio receiver to the control device. The reduced set of metadata pertains to and is contemporary with processing performed by the radio receiver. The metadata was received by the radio receiver over a broadcast radio link, and the metadata includes a tuned channel indicator of a radio channel being received by the radio receiver. The method also includes receiving a device identifier from the radio receiver and transmitting, over the connection, a control command to the radio receiver. The method includes determining a first authentication code that is derived from the device identifier in accordance with an algorithm defined within the radio receiver. The method also includes transmitting the first authentication code from the control device to the radio receiver. The method further includes receiving, in response to transmitting the first authentication code, an enhanced set of metadata over the connection. The enhanced set of metadata pertains to and is contemporary with processing performed by the radio receiver. The enhanced set of metadata includes a song title and artist that was received by the radio receiver over the broadcast radio link.

In accordance with another aspect of the present invention, a method on a radio receiver for authenticating a control device includes receiving a broadcast radio signal that carries data including at least one radio channel, a reduced set of metadata and an enhanced set of metadata. The reduced set of metadata and the enhanced set of metadata pertain to and are contemporary with processing performed by the radio receiver. The reduced set of metadata includes a tuned channel indicator of a received radio channel being received by the radio receiver and the enhanced set of metadata includes a song title and artist having been received by the radio receiver over the broadcast radio link. The method also includes establishing a connection from a radio receiver to a control device, the connection communicating the reduced set of metadata from the radio receiver to the control device. The method further includes providing, over the connection, a device identifier from the radio receiver. The method also includes determining, based upon the device identifier, a valid authentication code and receiving, over the connection, a received authentication code. The method also includes validating the received authentication code based upon the valid authentication code and transmitting, in response to validating the received authentication code, the enhanced set of metadata over the connection.

In accordance with a further embodiment of the present invention, an automated method performed in a tunable radio receiving set having a tunable receiver for receiving broadcast audio content and for receiving broadcast metadata on one of a multiplicity of channels, where the tunable receiving set is independently controllable by a first type of control device and a second type of control device, includes determining that a control device coupled to the tunable receiving set is of a first type or of a second type. The method further includes configuring, in response to the determining, the tunable receiver set. The configuring includes performing, in response to determining that the control device is of the first type, the following: enabling channel selection of the tunable receiver in response to control command signals received from the control unit; reproducing broadcast audio content received by the tunable receiver; reproducing a reduced set of broadcast metadata received by the tunable receiver that is descriptive of the selected channel; and reproducing an enhanced set of broadcast metadata received by the radio receiver that is descriptive of the audio content received by radio. The configuring also includes performing, in response to determining that the control device is of the second type, the following: enabling channel selection of the tunable receiver in response to control command signals received from the control unit; reproducing broadcast audio content received by the tunable receiver; and enabling reproduction of the reduced set of broadcast metadata received by the radio receiver that is descriptive of the selected channel and disabling reproduction of the enhanced set of broadcast metadata received by the radio receiver that is descriptive of the audio content received by radio.

In accordance with an further embodiment of the present invention, a machine implemented method in a control device connected to a tunable radio receiving set having a tunable receiver for receiving broadcast audio content and broadcast metadata on one of a multiplicity of channels, where the tunable receiver is controllable by a control device, includes transmitting command signals to the tunable radio receiving set to select one tuned channel for the tunable receiver. The command signals also enabling the tunable receiver to reproduce broadcast audio content received by the tunable receiver. The method also includes receiving, from the tunable receiving set, a device identifier uniquely identifying the tunable receiving set. The method also includes determining, based upon the device identifier, an authentication code in accordance with a predefined algorithm and transmitting the authentication code to the tunable receiving set in order to enable the tunable receiving set to communicate broadcast metadata that is received by the tunable receiver and that is descriptive of the audio content received by tunable receiver. The method further includes determining, based upon the device identifier, a decryption code in accordance with a predefined algorithm. The method further includes receiving, from the tunable receiving set, reduced broadcast metadata that is descriptive of the selected channel being received by the tunable receiver, and reproducing, without using the decryption code, the reduced broadcast metadata received by the tunable receiver and descriptive of the selected channel. The method also includes receiving, from the tunable receiving set, broadcast metadata that is received by the tunable receiver and that is descriptive of the audio content received by the tunable receiver, decrypting, based upon the decryption code, broadcast metadata received by the tunable receiver that is descriptive of the audio content received by tunable receiver, and reproducing the decrypted broadcast metadata received by the tunable receiver that is descriptive of the audio content received by tunable receiver.

BRIEF DESCRIPTION OF THE DRAWINGS

In the accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DESCRIPTION OF THE PREFERRED EMBODIMENTS

Figure 1:
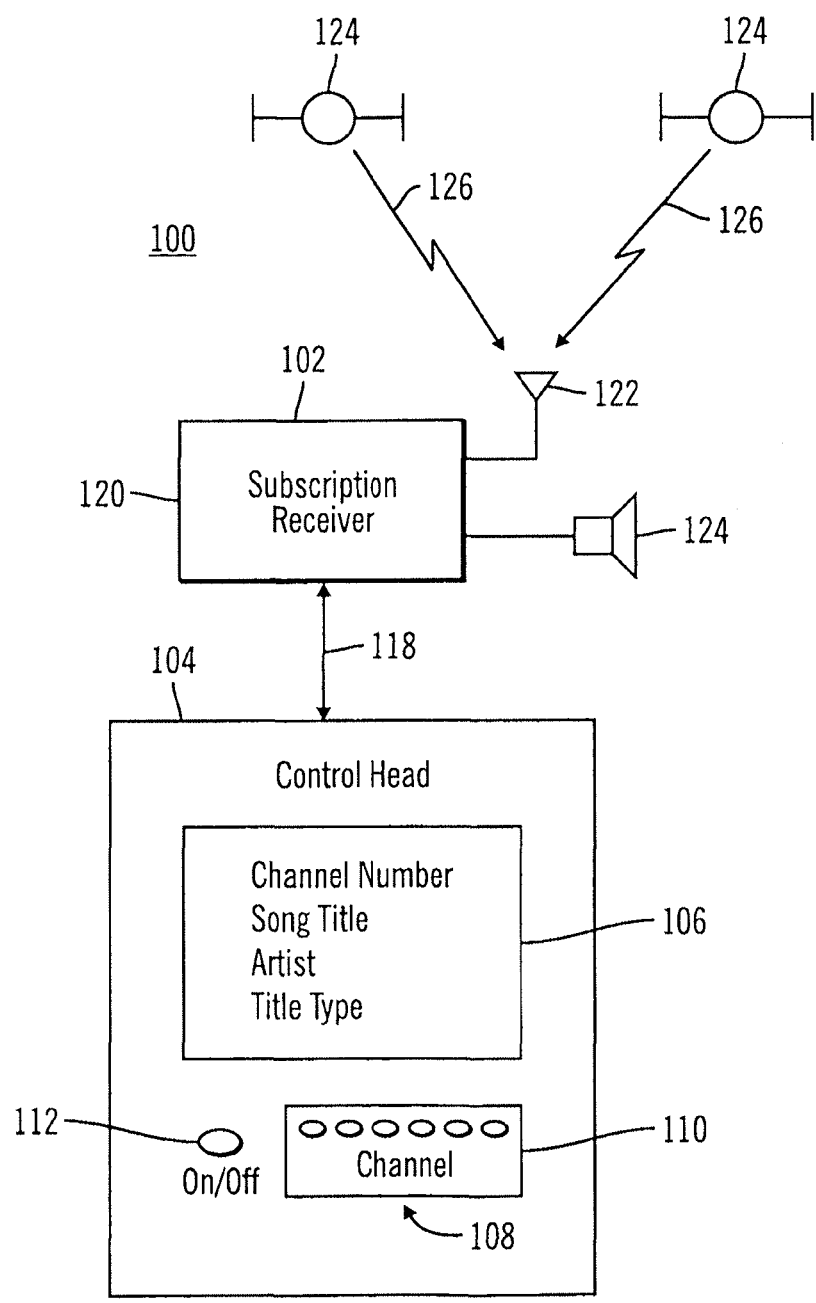
FIG. 1 is an overall system diagram of a satellite radio receiver with detachable control head, in accordance with an exemplary embodiment of the present invention.

In the accompanying figures, where like reference numerals refer to identical or functionally similar elements throughout the separate views and which together with the detailed below are incorporated in and form part of the specification, serve to further illustrate various embodiments and to explain various principles and advantages all in accordance with the present invention.

FIG. 1 is an overall system diagram 100 of a satellite radio receiver with detachable controller 104, in accordance with an exemplary embodiment of the present invention. The overall system diagram 100 illustrates a tunable radio receiver 102 that is connected to a detachable controller 104. The radio receiver 102 of the exemplary embodiment is a subscription satellite receiver capable of receiving, for example, wide area satellite broadcast signals carrying subscription satellite radio services containing multiple channels of content, such as subscription satellite services provided by either or both of Sirius Satellite Radio, Incorporated or XM Satellite Radio Holdings, Incorporated. The subscription radio 102 of the exemplary embodiment includes a satellite signal antenna 122 that receives wide area broadcast radio signals 126 that are broadcast from one or more satellites 124 and that carry subscription satellite radio channels.

The subscription radio 102 of the exemplary embodiment is able to be selectively activated and deactivated by one or more subscription satellite service providers. The exemplary embodiment of the present invention allows activation signals to be transmitted to the subscription radio 102 via satellite 124 through the wide area broadcast radio signals 126. The wide area broadcast radio signals 126 are broadcast to all subscription radios within the area of the radio coverage for satellites 124. The subscription radios 102 include a unique identifier to uniquely identify each subscription radio from within the many of subscription radio receivers that are in operation. The subscription radio receivers 102 are able to receive broadcast activation signals and broadcast deactivation signals. The broadcast activation signals and broadcast deactivation signals include a unique identifier value to cause those signals to be specifically addressed to a particular subscription radio 102. A particular subscription radio 102 is selectively activated or selectively deactivated by receiving either a broadcast activation signal or a broadcast deactivation signal, respectively, that includes the unique identifier for that particular subscription radio 102.

The subscription radio 102 also includes an audio output that drives a speaker 124. The audio provided though the audio output is produced by processing of a received wide area satellite broadcast signal received by the radio receiver 102. Although a single speaker 124 is illustrated for clarity, the exemplary embodiment of the present invention provides audio output through a multi-speaker, high fidelity audio reproduction system. Further embodiments of the present invention are able to use any audio reproduction system, including single speaker, dual speaker, and any other suitable audio reproduction system.

The radio receiver 102 has a housing 120 that includes a connector 130 that is affixed to the radio receiver 102. The detachable controller 104 is physically detachably coupled to the radio receiver 102 by connecting a cable with a connector 118 to the connector 130 that is affixed to the housing 120 of the radio receiver 102. Although the detachable controller 102 of the exemplary embodiment is connected through a cable to the radio receiver 102, further embodiments couple through a wireless data link. Detachable in this context refers to the ability of the controller to be detached, either physically or by termination of a wired or wireless data link, from the radio receiver 102.

The detachable controller 104 includes a display 106 that is an alpha-numeric and graphical display in the exemplary embodiment. Display 106 is able to display, for example, tuned channel indicators that include a channel number, channel name, a channel category, a song title and an artist that all pertain to and are contemporary with the audio output being produced by processing of the radio receiver 102. The display 106 as illustrated displays the channel number, song title, artist, and title type.

The detachable controller 104 of the exemplary embodiment further includes user input devices 108 that include an on/off switch 112 and a set of channel pushbuttons 110. The detachable controller 104 monitors the user's operation of user input devices 108 and generates corresponding control commands to be sent to the radio receiver 102. For example, when the on/off switch 112 is depressed by a user, a toggle power control command is generated by the detachable controller 104 and transmitted to the radio receiver 102. A user's depressing a pushbutton within the set of channel pushbuttons 110 causes the detachable controller 104 to generate a control command that is sent to the radio receiver that instructs the radio receiver to tune to the channel that corresponds to the pressed pushbutton.

Figure 2:
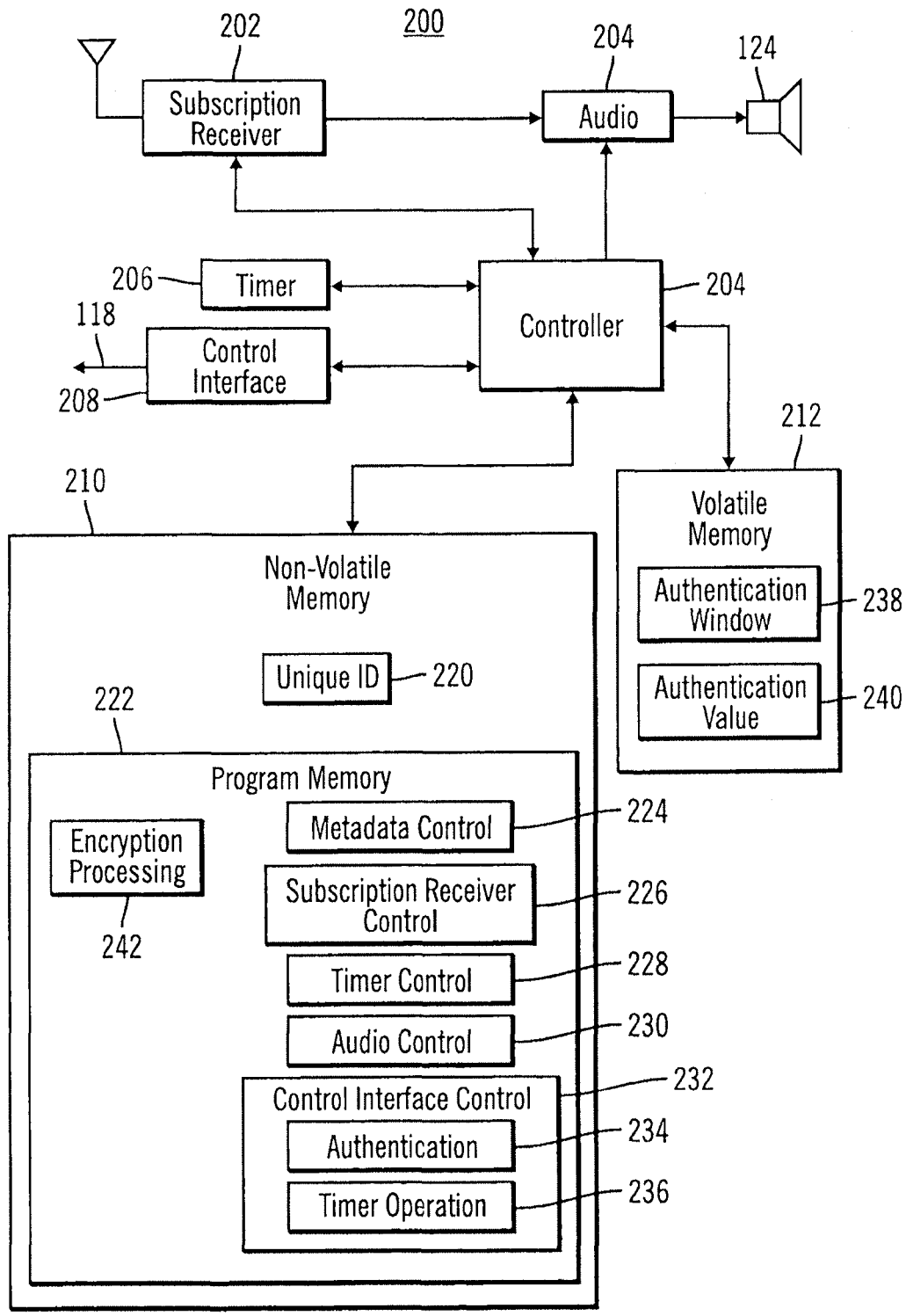
FIG. 2 is a radio receiver schematic diagram in accordance with an exemplary embodiment in the present invention.

FIG. 2 is a radio receiver schematic diagram 200 in accordance with an exemplary embodiment in the present invention. The radio receiver schematic diagram 200 includes a broadcast receiver 202 that is able to receive and process a wide area broadcast radio signal to produce a selected audio component contained within the wide area broadcast radio signal. The wide area broadcast signal of the exemplary embodiment of the present invention is a subscription satellite broadcast signal that contains a number of separate audio and/or audio and visual channels. The broadcast receiver 202 is able to selectively tune to a tuned channel within the multiple channels of the wide area broadcast signal to produce a selected audio component. The selected audio component is able to be a stand alone selected audio component signal or part of an audio-visual presentation that is produced by the radio receiver 102. The broadcast receiver 202 simultaneously receives a metadata contained within the wide area broadcast signal. The metadata contained within the wide area broadcast radio signal contains metadata that pertains to and that is contemporary with the selected audio component produced by the broadcast receiver 202. The metadata received by the broadcast receiver 202 includes a reduced set of metadata and an enhanced set of metadata. The reduced set of metadata in the exemplary embodiment includes a tuned channel indicator of a received radio channel being received by the radio receiver. The enhanced set of metadata includes a song title and artist for audio content contained within one or more of the channels within the wide area broadcast radio signal, including such information about the selected audio component of the channel to which the broadcast receiver 202 is tuned.

The radio receiver includes an audio processor 204 that accepts the selected audio component produced by the broadcast receiver 202. The audio processor prepares and transforms that signal as required to be able to drive speaker 124.

The radio receiver includes a controller 204. Controller 204 of the exemplary embodiment is a programmable microcontroller configured to perform the data processing described below for the radio receiver 102. The radio receiver schematic diagram 200 includes a timer 206 to provide real time timing services to support processing performed by the controller 204. Timer 206 is able, for example, to be programmed to generate an interrupt for controller 204 within a specified time period. The radio receiver schematic further includes a control interface 208. Control interface 208 provides processing to interface the controller 204, and the radio receiver 102 as a whole, to the detachable controller 104 through a cable with a connector 118. Further embodiments of the present invention are able to include a wireless data interface as the control interface 208.

Controller 206 accesses non-volatile memory 210 and volatile memory 212. The non-volatile memory 210 generally stores information that does not frequently change, although the contents of the non-volatile memory 210 are able to be modified under the control of controller 204 or by external programming equipment. Non-volatile memory 210 includes a unique identifier 220 that is used to uniquely identify the particular subscription radio 102 from within a group of all subscription radios that are able to be controlled by a detachable controller 104.

Non-volatile memory 210 further includes program memory 222 that is used to store computer programs with instructions for the controller 204 to implement the methods and processing performed by a radio receiver 102 of the exemplary embodiment of the present invention. The program memory 222 includes a metadata control program 224 that controls selectively providing either just reduced metadata or both reduced metadata and enhanced metadata to the detachable controller 104. As described in detail below, the operation of the radio receiver 102 of the exemplary embodiment provides only reduced metadata to a detachable controller 104 unless that detachable controller 104 has been authenticated. After authentication of the detachable controller 104, the radio receiver provides, under control of the metadata control program 224, both the reduced metadata and the enhanced metadata.

The program memory 222 further includes an encryption processing module 242 that cooperatively operates with the metadata control program 224 to encrypt enhanced metadata that is sent to the detachable controller 104. The various embodiments of the present invention support any type of encryption processing to encrypt only all or part of the enhanced metadata, or to encrypt all or part of all metadata supplied to the detachable controller 224. These various embodiments are able to use, for example, public key encryption techniques such as RSA encryption, private key encryption techniques, and any other suitable encryption technique to provide a desired level of security for the metadata being produced by the radio receiver 102. The exemplary embodiment uses a private key encryption technique whereby the radio receiver 102 and the detachable controller 104 are configured to have the same private encryption key. The processing of the radio receiver 102 of the exemplary embodiment derives a decryption code from the value of the unique identifier 220 for the particular radio receiver 102. The derived decryption code is then transmitted to the detachable controller 104 in order to select a proper decryption key for decrypting encrypted metadata received from the radio receiver 102.

The program memory also includes a subscription receiver control program 226. The subscription receiver control program contains instructions to control the operation of the subscription radio receiver 102 of the exemplary embodiment, such as controlling of processing associated with tuning the broadcast receiver, and other processing performed by the controller to operate the radio receiver 102. A timer control program 228 is also stored in the program memory 222 and controls operation of timer 206. An audio control program 230 is stored in the program memory and includes programs to control the audio processor 204 of the exemplary embodiment.

Program memory 222 includes a control interface control program 232 that includes an authentication subprogram 234 and a timer operation subprogram 236. The operation of these subprograms is explained in further detail below.

Volatile memory 212 is used to store transient data in the exemplary embodiment of the present invention. Volatile memory 212 stores an authentication window 238 that contains a time frame in which an authentication code is required to be received from a detachable controller 104, as is described in further detail below. Volatile memory 212 further stores an authentication value 240 that is a determined valid authentication code, which is described in further detail below.

Figure 3:
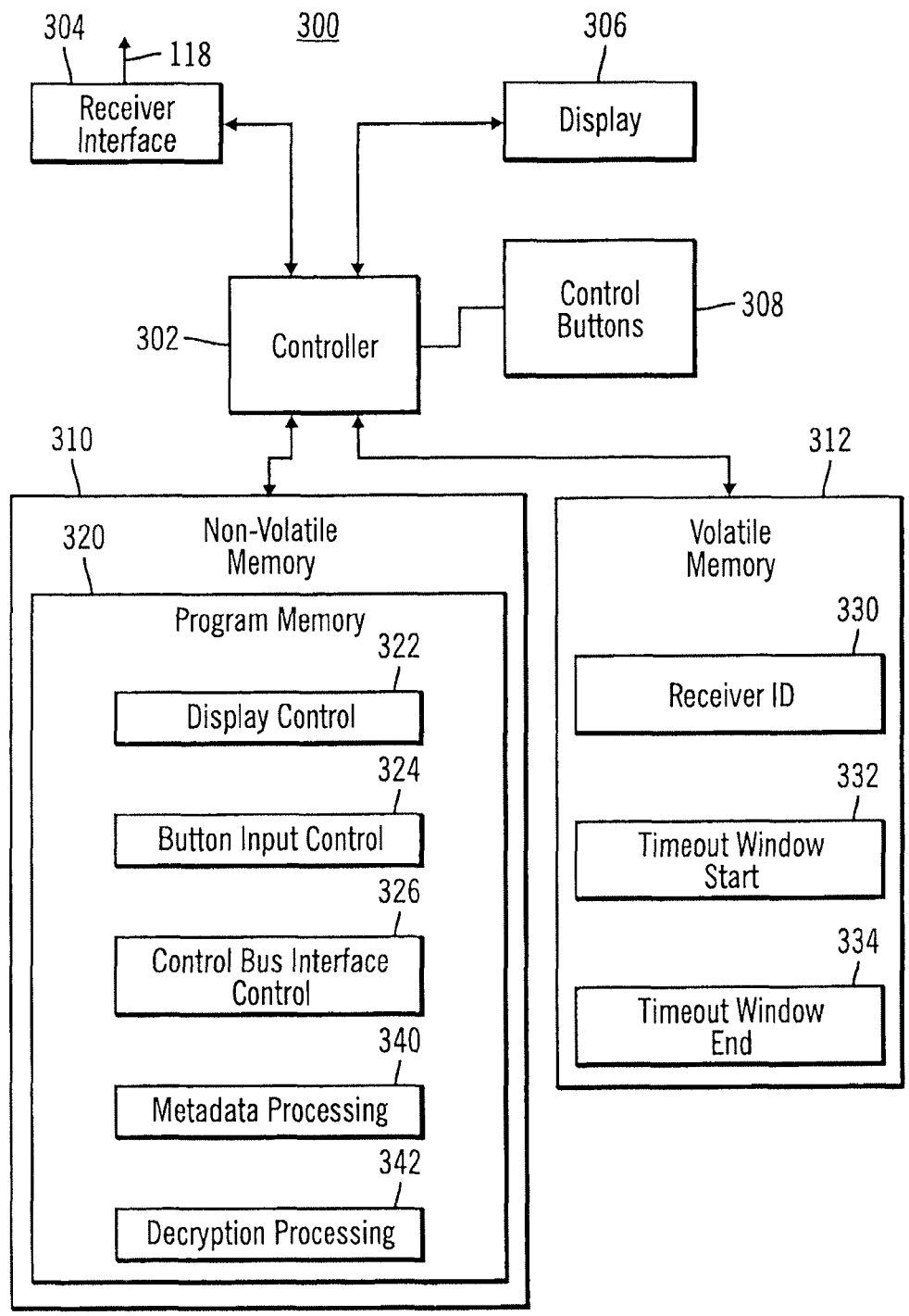
FIG. 3 is a detachable controller schematic diagram, in accordance with an exemplary embodiment of the present invention.

FIG. 3 is a detachable controller schematic diagram 300, in accordance with an exemplary embodiment of the present invention. The detachable controller schematic diagram 300 illustrates the components of an exemplary detachable controller 104 for the exemplary embodiment.

The detachable controller includes a controller 302 that controls the processing performed by the detachable controller 104 of the exemplary embodiment. Controller 302 of the exemplary embodiment is a programmable microcontroller.

Controller 302 exchanges data with a receiver interface 304. Receiver interface 304 provides an electrical interface through the cable with connector 118 that is detachably connected to a radio receiver 102. The receiver interface 304 carries commands from the controller 302 to the radio receiver 102, and receives data, including reduced metadata and enhanced metadata, from the radio receiver 102, that is conveyed to the controller 302. The receiver interface 304 of further embodiments is able to include a wireless coupling, such as a Bluetooth connection or a wireless data connection conforming to a standard within the WEE 802.11 standards.

Controller 302 drives an alpha-numeric and graphical display 306 which, in the exemplary embodiment, displays reduced metadata and enhanced metadata that is received from the radio receiver 102. The controller 302 further includes control buttons 308, which correspond to the user input devices 108 described above.

Controller 302 accesses data stored in non-volatile memory 310 and volatile memory 312. The non-volatile memory 310 is similar to the non-volatile memory 210 of the radio receiver 102 and generally stores information that does not frequently change, although the contents of the non-volatile memory 310 are able to be modified under the control of controller 302 or by external programming equipment. The volatile memory 312 of the detachable controller 104 is also used to store transient data in the exemplary embodiment of the present invention. The detachable controller non-volatile memory 312 includes a program memory 320 that is used to store computer programs with instructions for the controller 302 to implement the methods and processing performed by a detachable controller 104 of the exemplary embodiment of the present invention. Program memory 320 includes a display control program 322 that controls display of information, such as metadata received from a radio receiver 102, on display 306. Program memory 320 further includes a button input control program 324 that controls operations associated with user inputs received from the control buttons 308. The program memory 320 also includes a control bus interface control program 326 that performs control and data processing algorithms required to properly interface, authenticate, generate control commands and process received metadata from a radio receiver 102, as is described in detail below.

The program memory 320 further includes a metadata processing program 340 that is used to store, further process, store as required, and prepare metadata received from the radio receiver 102. The program memory further includes a decryption processing program 342 that operates with the metadata processing program 340 to decrypt encrypted metadata that is received from the radio receiver 102. As described above, various embodiments of the present invention are able to incorporate any suitable encryption algorithm to protect some or all of the metadata that is transferred between the radio receiver 102 and the detachable controller 104. The exemplary embodiment of the present invention uses a private key encryption algorithm wherein a decryption code, which identifies the required decryption key, is transmitted from the radio receiver 102 to the detachable controller 104 to allow proper decryption key selection and decryption of encrypted metadata received from the radio receiver 102.

Volatile memory 312 of the exemplary embodiment stores a receiver identifier 330 that is the unique identifier received from the radio receiver 102. The data received and stored as the receiver identifier 330 is used in the exemplary embodiment to determine an authentication code, as is described below. The volatile memory of the exemplary embodiment further stores a timeout window start time 332 and a timeout window end time 334. These timeout window values are used to support continued authentication processing, as is described below.

Figure 4:
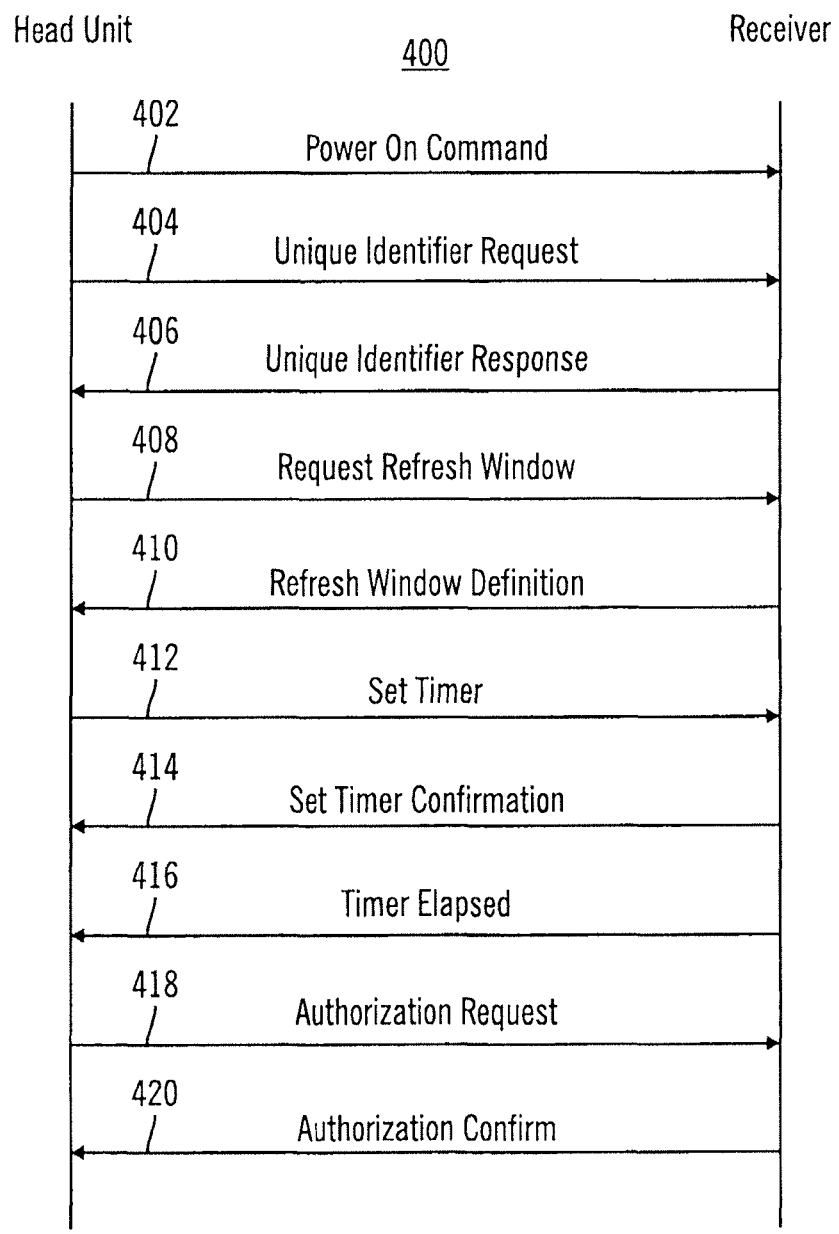
FIG. 4 is an authentication data message exchange diagram for authentication of a detachable controller by a radio receiver, in accordance with an exemplary embodiment of the present invention.

FIG. 4 is an authentication data message exchange diagram 400 for authentication of a detachable controller 104 by a radio receiver 102, in accordance with an exemplary embodiment of the present invention. The authentication of a detachable controller 104 by a radio receiver 102 of the exemplary embodiment begins by the detachable controller 104 sending a power on command 402. The power on command 402 instructs the radio receiver 102 to transition from a standby to an operation mode. The detachable controller 104 then transmits a unique identifier request 404 to the radio receiver 102 in order to cause a response by the radio receiver 102 that contains the unique identifier of that radio receiver 102.

The authentication data message exchange continues with the radio receiver 102 returning a unique identifier response message 406, which is an identification signal in the exemplary embodiment, that contains the unique identifier for the radio receiver 102. The unique identifier response message 406 of the exemplary embodiment further includes an indication of whether the radio receiver 102 has received at least one of a broadcast activation signal and a broadcast deactivation signal. The radio receiver 102 of the exemplary embodiment defines a refresh time window in which a next authentication request is required to be sent from the detachable controller 104 to the radio receiver 102 in order for the detachable controller 104 to be properly authenticated. The detachable controller 104 transmits a request refresh window message 408 to the radio receiver 102 in order to receive a specification of the time window in which the authentication request is to be sent. The detachable controller 104 receives a refresh window definition message 410 that is transmitted by the radio receiver 102 in response to the request refresh window request 408.

The detachable controller 104 of the exemplary embodiment does not include a timer that is able to trigger the sending of an authentication request during the specified authentication refresh window. The detachable controller 104 of the exemplary embodiment utilizes a timer and associated processing that is included within the radio receiver 102 to properly trigger the transmission of an authentication request. The detachable controller 104 sends a set timer message 412 to the radio receiver 102 that specifies the time at which to send an elapsed time signal from the radio receiver 102 to the detachable controller 104. The radio receiver 102 receives the set timer message 412 and responds with a set timer confirmation message 414 to confirm proper receipt of the message. The radio receiver 102 then delays for the time period specified within the set timer message 412. The radio receiver 102 then sends a timer elapsed message 416 to the detachable controller 104 as a notification that the time specified in the set timer message 412 elapsed. The timer elapsed message 416 is transmitted over the connection between the radio receiver 102 and the detachable controller 104 in the exemplary embodiment.

In response to receipt of the timer elapsed message 416, the detachable controller 104 sends an authorization request 418. The authorization request of the exemplary embodiment is an authentication signal that is responsive to the identification signal sent by the radio receiver 102. The authorization request includes an authentication code calculated by the detachable controller 104 based upon the unique identifier received from the radio receiver 102 in the unique identifier response message 406. The authentication code of the exemplary embodiment is determined by a pre-defined algorithm, such as a hash algorithm, a cryptologic algorithm or any other suitable algorithm. The radio receiver 102 determines if the authorization request is valid and then responds to the authorization request message 418 by sending an authorization confirm message 420. The Authorization confirm message 420 is able to contain an authorization "successful" or "unsuccessful" flag to notify the detachable controller of the success or failure, respectively, of its authentication. Upon receipt of the authorization request and determination that the authorization request is valid, the radio receiver 102 continues to send enhanced metadata to the detachable controller 104.

Figure 5:
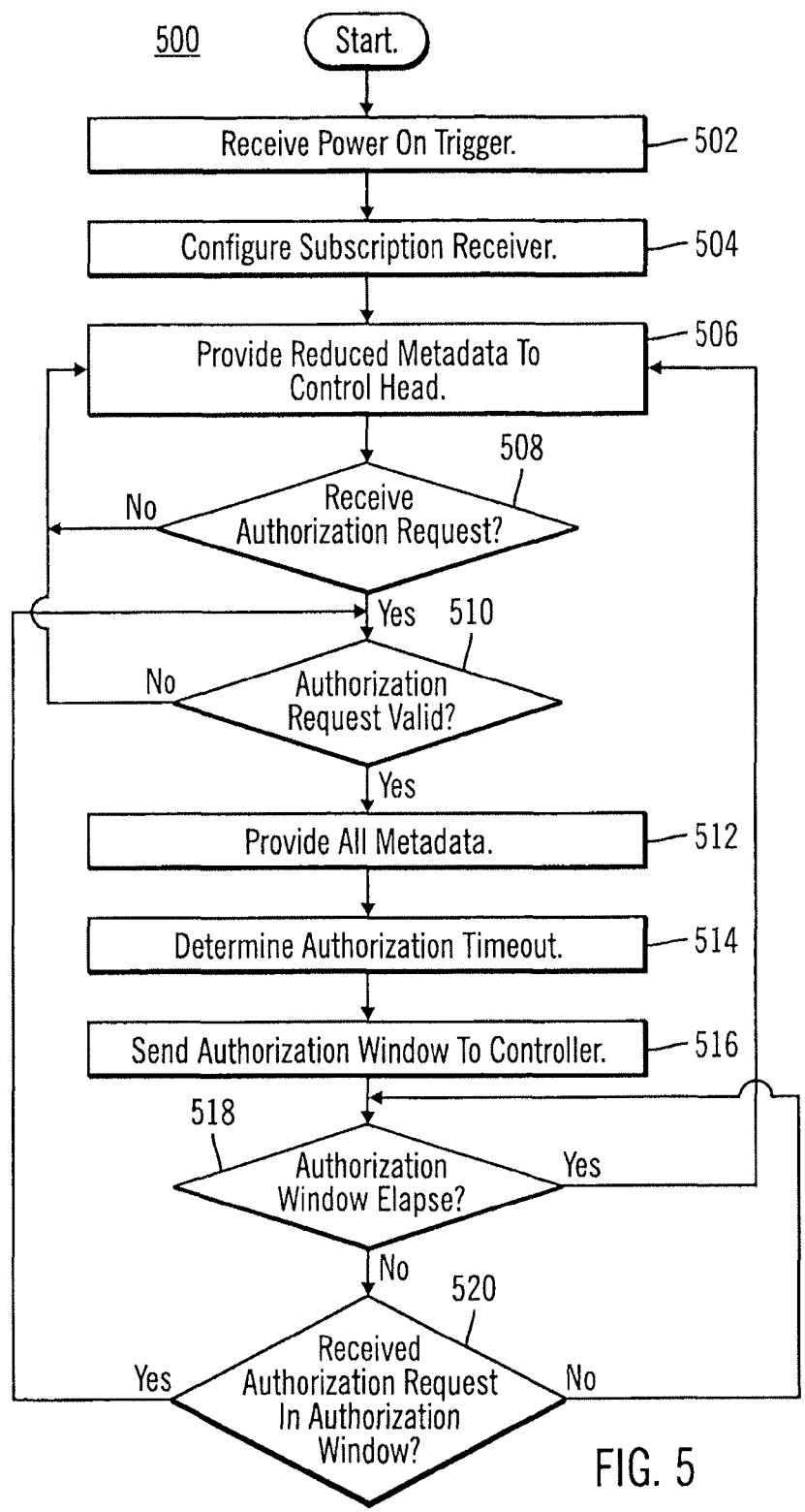
FIG. 5 is an authentication processing flow diagram for authentication of a detachable controller in accordance with an exemplary embodiment of the present invention.

FIG. 5 is an authentication processing flow diagram 500 for authentication of a detachable controller in accordance with an exemplary embodiment of the present invention. The authentication processing flow diagram 500 illustrates processing performed by a radio receiver 102 in order to initially authorize a detachable controller 104 and to maintain that authorization during continued operations. The authorization processing begins by receiving, at step 502, a power on trigger from the detachable controller 104. Communication of the power on trigger establishes a connection from the radio receiver 102 to the detachable controller 104, and causes the radio receiver 102 to enter an operational mode. Upon entering this operation mode, the detachable controller 104 is determined to be in an unauthorized state. The authentication processing next configures, at step 504, the radio receiver 102. This configuration is performed by the processing within the radio receiver 102 in response to configuration commands received from the detachable controller 104. The radio receiver 102 of the exemplary embodiment is able to accept configuration commands, and other operating commands, from a detachable controller 104 regardless of the authorization state of the detachable controller 104. The processing of the radio receiver 102 next provides, at step 506, a reduced set of metadata and the receiver identifier to the detachable controller 104. The reduced set of metadata is sent to the detachable controller 104 regardless of the authorization state of the detachable controller 104. The reduced set of metadata includes, for example, the tuned channel number for the subscription radio 102. The receiver identifier is transmitted to the detachable controller 104 in the exemplary embodiment in response to a request transmitted from the detachable controller 104, as is described above.

The authorization processing of the radio receiver 102 next receives, at step 508, an authorization request from the detachable controller 104. This authorization request includes a determined authentication code that is based upon the unique receiver identifier provided to the detachable controller 104 by the radio receiver 102. The authentication code is determined in accordance with an algorithm defined within radio receiver 102. Examples of such algorithms include, for example, a hash code, a cycle redundancy check, and other such algorithms that produce an encoded value based upon input data. The radio receiver 102 then determines, at step 510, if the authorization request is valid. Validation of the authorization request in the exemplary embodiment is performed by comparing if the determined authentication code received in the authorization request from the detachable controller 104 is equal to an expected value based upon the algorithm defined within the radio receiver 102. If the authorization request is determined to not be valid, the processing returns to providing, at step 506, reduced metadata to the detachable controller 104.

If the authorization request sent by the detachable controller 104 is determined to be valid, the processing of the radio receiver 102 then configures itself to provide, at step 512, all metadata to the detachable controller 104. The radio receiver 102 of the exemplary embodiment provides an enhanced set of metadata in response to this configuration, which includes, for example, a song title and a song artist for a song currently being broadcast on the tuned channel of the radio receiver 102.

The processing of the radio receiver 102 then determines, at step 514, an authorization timeout period. This authorization timeout period is a period in which a subsequent authorization request is required to be received from the detachable controller 104 or the detachable controller 104 will become unauthorized and receive only reduced metadata. The processing of the radio receiver 102 determines an authorization refresh window, which is a time window around the authorization timeout period during which an authorization request is required to be received from the detachable controller 104. The processing then sends, at step 516, a specification of the authorization refresh window to the detachable controller 104 and awaits for the expiration of that authorization refresh window. The processing determines, at step 518, if the authorization refresh window has elapsed. If the authorization time window is determined to have elapsed, the processing returns to providing, at step 506, reduced metadata to the detachable controller 104. If the authorization time window has not elapsed, the processing determines, at step 520, if an authorization request has been received within the time window. If no request has been received, the processing returns to determining, at step 518, if the authorization time window has elapsed. If an authorization request has been received within the authorization time window, the processing returns to determining, at step 510, if the request is valid, and the subsequent processing described above. Of particular note is that the authorization refresh windows that are determined in step 514 during subsequent iterations are able to differ in each of the iterations. In some embodiments, the determined authorization refresh windows are set to be separated by a time period that is based upon a time period of content being received. An example of setting different authorization refresh windows is to have a next authorization refresh window separated from a current authorization refresh window by a length of a song being played.

Figure 6:
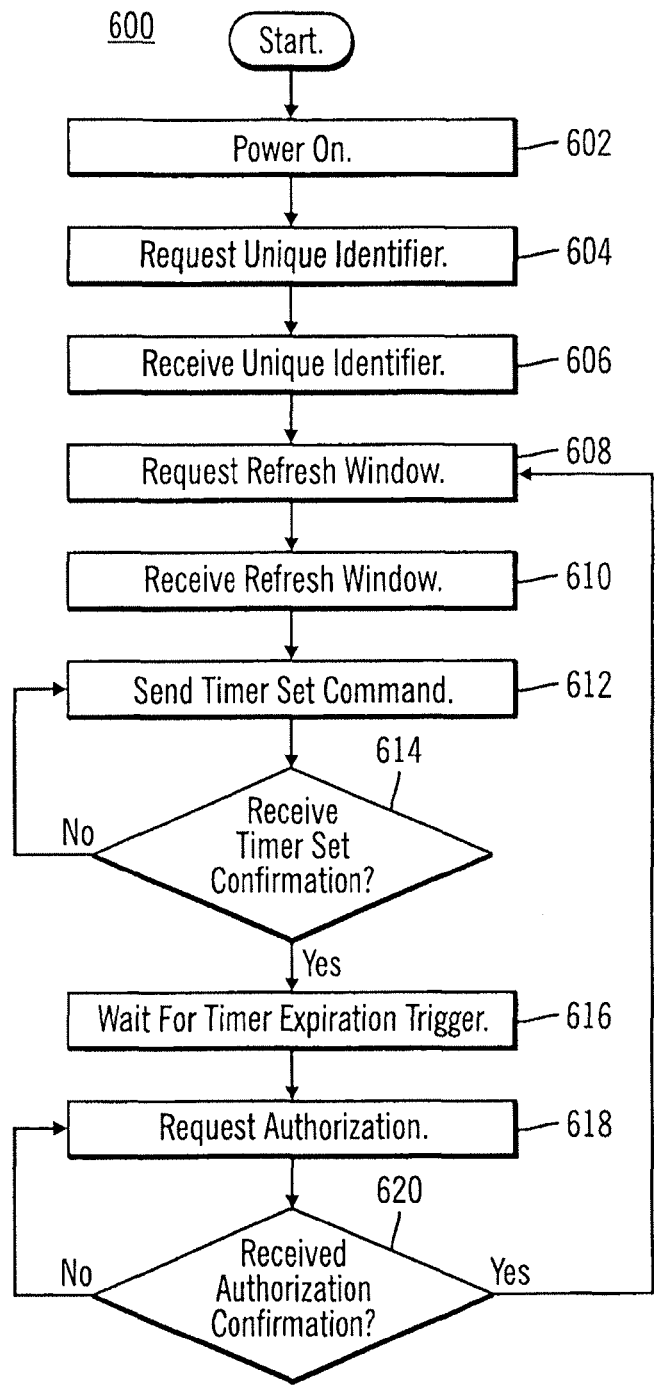
FIG. 6 is a detachable controller processing flow diagram performed on a detachable controller for maintaining authentication, in accordance with an exemplary embodiment of the present invention.

FIG. 6 is a detachable controller processing flow diagram 600 performed on a detachable controller for maintaining authentication, in accordance with an exemplary embodiment of the present invention. This processing begins by powering on, at step 602. The powering on processing includes sending a power on command to the radio receiver 102. A data communications connection is thereby established between the radio receiver 102 and the detachable controller 104.

The detachable controller processing then requests, at step 604, a unique identifier from the subscription radio 102 to which the detachable controller 104 is attached. The processing next receives, at step 606, the unique identifier sent by the subscription radio 102 to the detachable controller 104 in response to the request. The processing next requests, at step 608, a refresh window from the subscription radio 102, which is a time window in which a subsequent authentication request is to be sent by the detachable controller 104. The processing then receives, at step 610, a refresh time window from the subscription radio. The processing then sends, at step 612, a timer set command to the subscription radio 102 in order to configure a timer within the subscription radio 102 to provide a notification of the occurrence of the refresh window.

The detachable controller processing next determines, at step 614, if a timer set confirmation message is received from the radio receiver 102. If this confirmation message is not received, the processing returns to sending, at step 612, a timer set command. If a timer set confirmation is received, the processing waits, at step 616, for a timer expiration trigger message to be sent from the radio receiver 102. After the timer expiration trigger is received, the processing requests, at step 618, authorization by sending an authorization request message to the radio receiver 102. The processing next determines, at step 620, if an authorization confirmation message is received. If an authorization confirmation message has not been received, the processing again sends, at step 618, an authorization request. If an authorization confirmation message has been received, the processing returns to requesting, at step 608, a refresh window and performing the subsequent processing described above.

Figure 7:
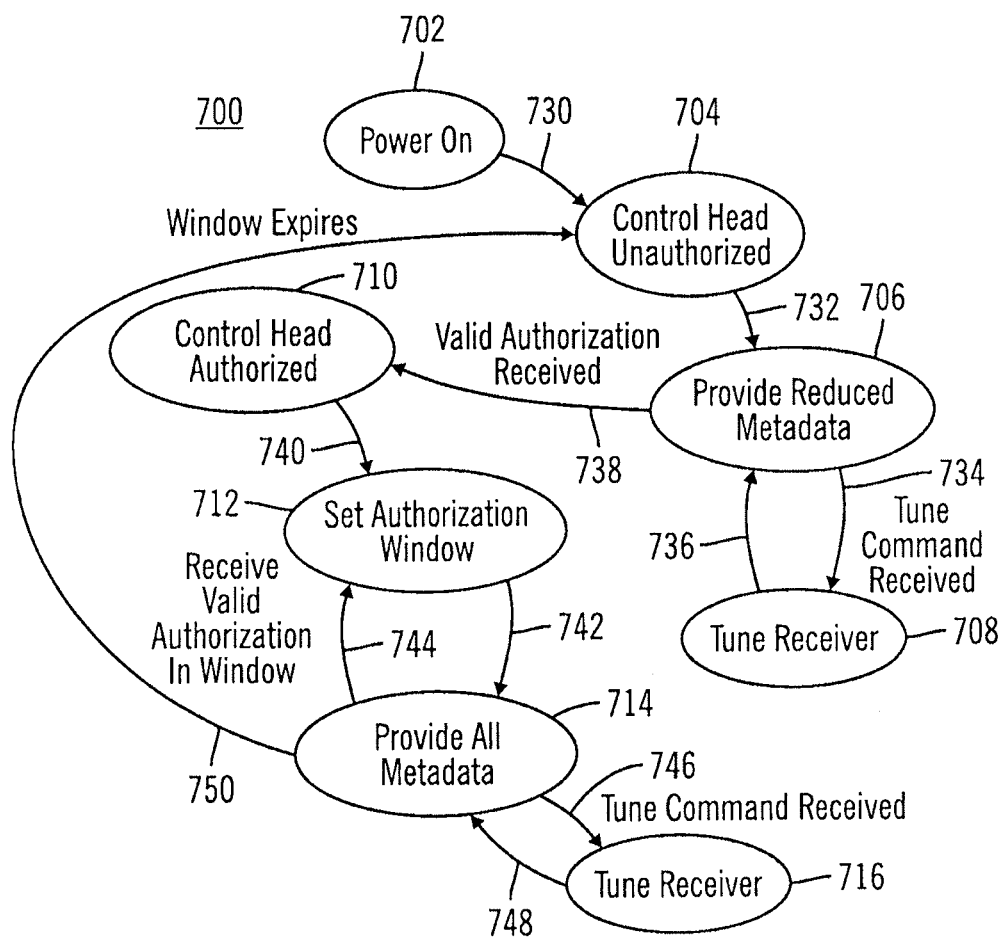
FIG. 7 is a radio receiver state diagram for authentication and controlling data transmission to a detachable controller, in accordance with an exemplary embodiment of the present invention.

FIG. 7 is a radio receiver state diagram 700 for authentication and controlling data transmission to a detachable controller, in accordance with an exemplary embodiment of the present invention. The initial state of the radio receiver 102 is a power on state 702. After power on processing, which generally involves initial configuration of the radio receiver 102, the radio receiver 102 performs transition 730 to a control head unauthorized state 704. The radio receiver 102 then performs transition 732 to provide a reduced metadata state 706. In the reduced metadata state 706, reduced metadata is provided to the detachable controller 104. The radio receiver 102 is also configured to accept control commands from the detachable controller 104 while in the reduced metadata state 706. This supports, for example, the tune command received transition 734 that is performed in response to receiving a tune receiver command from the detachable controller 104. The radio receiver 102 enters the tune receiver state 708 in response to receiving the tune receiver command and tunes the receiver to the channel specified by the command. The radio receiver 102 then performs a transition 736 to return to the reduced metadata state 706.

The radio receiver 102 performs the valid authorization received transition 738 in response to receiving a valid authorization request from a connected detachable controller 104. After the valid authorization received transition 738, the radio receiver 102 enters a control head authorized state 710. The radio receiver 102 performs transition 740 from the control head authorized state 710 to a set authorization window state 712. In the set authorization window state 712, the radio receiver 102 determines a time window in which the detachable controller 104 is required to send an authorization request to the radio receiver 102. This time window in which the detachable controller 104 is required to send an authorization request occurs at a pseudo-random time in the future that is based upon a time period of content within the audio being produced by the radio receiver 102. For example, this time window may be configured to occur sometime within an expected time of play for the next song of the currently tuned channel. Such a configuration advantageously restricts the provision of enhanced metadata to a time period of a single song unless the detachable controller 104 successfully re-authenticates itself.

After setting the authorization window, the radio receiver 102 performs transition 741 to enter an all metadata state 714. In the provide all metadata state 714 of the exemplary embodiment, the radio receiver 102 provides enhanced metadata to the detachable controller 104. The radio receiver 102 of the exemplary embodiment also accepts control commands from the detachable controller 104 while in the all metadata state 714. This supports, for example, the tune command received transition 746 that is performed in response to receiving a tune receiver command from the detachable controller 104. The radio receiver 102 enters the tune receiver state 716 in response to receiving the tune receiver command and tunes the receiver to the channel specified by the command. The radio receiver 102 then performs a transition 748 to return to the all metadata state 714.

While in the all metadata state 714, the radio receiver 102 awaits the expiration of the authorization time window. The radio receiver 102 performs a receive valid authorization in window transition 744 in response to receiving a valid authorization request from the detachable controller 104 during the authorization time window that was previously determined and communicated to the detachable controller 104. The radio receiver 102 enters the set authorization window state 712 after the valid authorization in window transition 744 and sets a new authorization time window. If a valid authorization request is not received during the authorization time window while the radio receiver 102 is in the all metadata state 714, the window expires transition 750 is performed and the radio receiver 102 reenters the control head unauthorized state 704.

Figure 8:
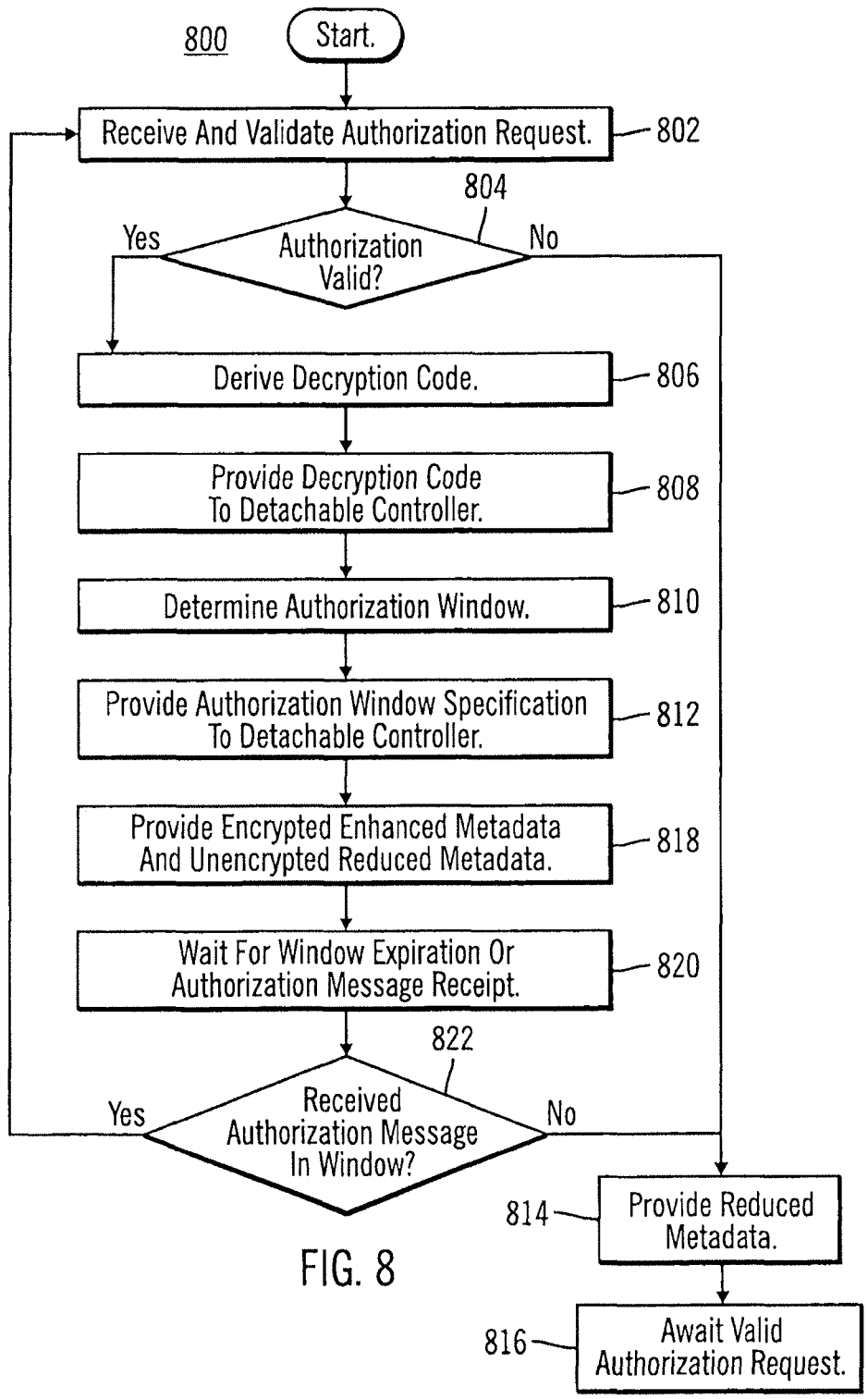
FIG. 8 is an encrypted metadata processing diagram for providing encrypted metadata to a detachable controller, in accordance with an exemplary embodiment of the present invention.

FIG. 8 is an encrypted metadata processing diagram 800 for providing encrypted metadata to a detachable controller, in accordance with an exemplary embodiment of the present invention. The encrypted metadata processing diagram 800 represents processing preformed by the radio receiver 102 of the exemplary embodiment for providing encrypted metadata to the detachable controller 104. The exemplary embodiment of the present invention encrypts a portion of the metadata provided to the detachable controller 104. The enhanced metadata, which includes broadcast metadata received by the tunable radio receiver 102 and which is also descriptive of audio content received by the radio receiver.

The encrypted metadata processing begins by receiving, at step 802, an authorization request from a detachable controller 104. The processing then determines, at step 804, if the authentication request is valid, such as through processing described above. If the authorization code is determined to be valid, the processing proceeds to derive, at step 806, a decryption code. The decryption code used by the exemplary embodiment is derived from the unique identifier 220 of the particular radio receiver 102 by using a pre-defined algorithm, such as a hash algorithm. The processing then provides, at step 808, the derived decryption code to the detachable controller 104. The processing continues by determining, at step 810, an authorization window in a manner similar to that described above. The processing continues by providing, at step 812, a specification of the determined authorization window. The processing of the exemplary embodiment continues by providing, at step 818, encrypted enhanced metadata and unencrypted reduced metadata to the detachable controller 104. The exemplary embodiment divides metadata into two groups, enhanced metadata that includes broadcast metadata received by the radio receiver and descriptive of the audio content received by radio, and reduced broadcast metadata that includes metadata that is descriptive of the selected channel being received by the tunable receiver. The enhanced metadata and the reduced metadata are able to be encrypted with different levels, e.g., with different strengths, of encryption. In the exemplary embodiment, the reduced metadata is not encrypted and the enhanced metadata is encrypted, thereby being more strongly encrypted than the reduced metadata. Further embodiments are able to operate without any encryption, by encrypting all metadata with the same level, or by using any combination of encryption of metadata provided to the detachable controller 104. The processing then waits, at step 820, for an authorization request to be received during the authorization window. The processing determines, at step 820, if an authorization request is received during the specified authentication window. If an authorization request is determined to be received during the specified authorization window, the returns to the receive and validate authorization processing, at step 802 and the subsequent processing described above.

If it is determined, at step 804, that the received authorization was not valid, or it was determined, at step 822, that the authorization request is not received during the specified authorization window, the processing proceeds to providing at step 814, reduced metadata. The processing then awaits, at step 816, for receipt of a valid authorization request.

Figure 9:
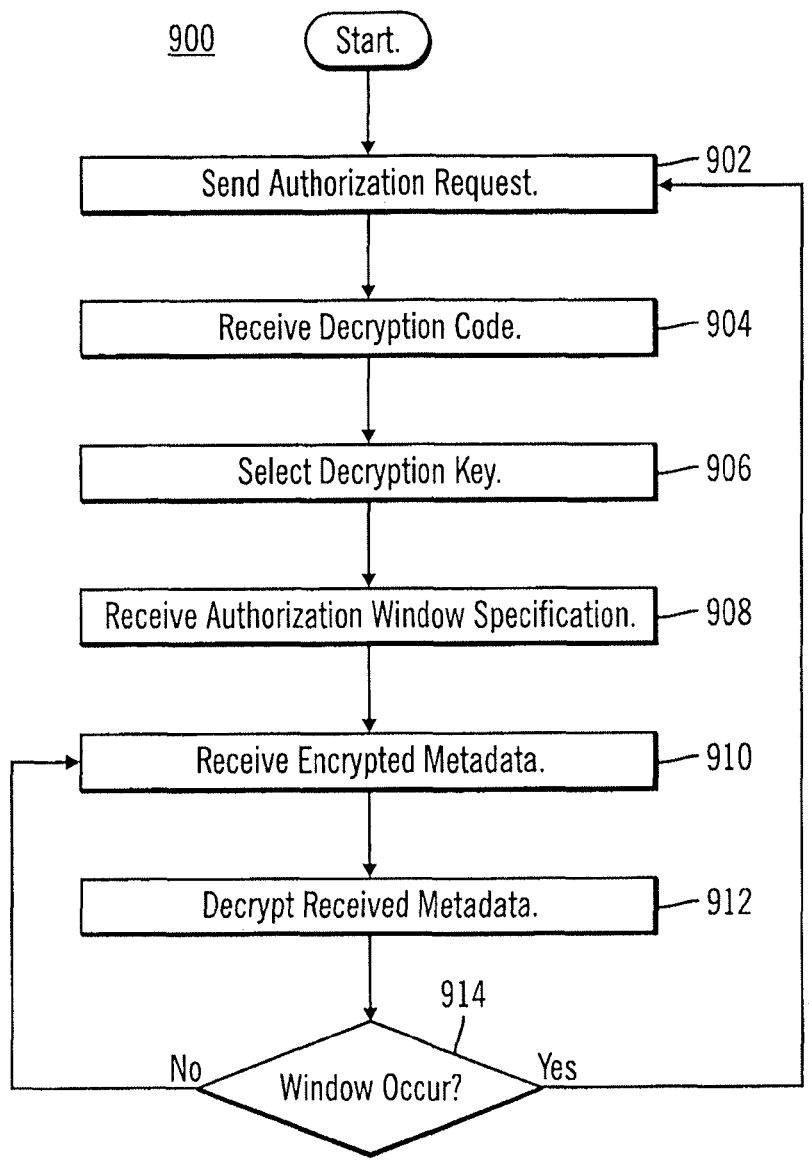
FIG. 9 is an encrypted metadata decryption processing diagram for decrypting encrypted metadata in a detachable controller, in accordance with an exemplary embodiment of the present invention.

FIG. 9 is an encrypted metadata decryption processing diagram 900 for decrypting encrypted metadata in a detachable controller, in accordance with an exemplary embodiment of the present invention. The encrypted metadata decryption processing diagram 900 represents processing performed on the detachable controller 104 of the exemplary embodiment. The encrypted metadata decryption processing begins by sending, at step 902, an authorization request to the radio receiver 102. The processing continues by receiving, at step 904, a decryption code from the radio receiver. A decryption key is then determined in the exemplary embodiment based upon the received decryption code. A decryption key is able to include, for example, a selected key from within a list of stored keys stored within the detachable controller. A further decryption key is able to include a definition of data juxtaposition instructions to be used to determine the decrypted metadata.

The processing continues by receiving, at step 908, an authorization window specification, which is a specification of a time window in which a subsequent authorization request is to be sent to the radio receiver 102 in order to maintain authorization and to receive the enhanced metadata. The processing continues by receiving, at step 910, encrypted enhanced metadata, along with unencrypted reduced metadata in the exemplary embodiment. The processing then decrypts, at step 912, the encrypted metadata. The processing finally determines, at step 914, if the time of the authorization window has arrived. If the time of the authorization window has not yet arrived, the processing returns to receiving, at step 910, encrypted metadata. If the time of the authorization window has arrived, the processing returns to sending, at step 902, an authorization request to the radio receiver, and continues to perform the related processing described above.

Non-limiting Software and Hardware Examples

Embodiments of the invention can be implemented as a program product for use with a computer system such as, for example, the computing environment shown in FIG. 1 and described herein. The program(s) of the program product defines functions of the embodiments (including the methods described herein) and can be contained on a variety of computer readable media. Illustrative computer readable medium include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such computer readable media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Each computer system may include, inter alia, one or more computers and at least a signal bearing medium allowing a computer to read data, instructions, messages or message packets, and other signal bearing information from the signal bearing medium. The signal bearing medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the signal bearing medium may comprise signal bearing information in a transitory state medium such as a network link and/or a network interface, including a wired network or a wireless network, that allow a computer to read such signal bearing information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. An automated method on a control device for authenticating a control device to a radio receiver, comprising:
communicating:
(a) commands from the control device to the radio receiver, and
(b) a reduced set of metadata from the radio receiver to the control device, the reduced set of metadata:
(i) pertaining to and being contemporary with processing performed by the radio receiver,
(ii) received by the radio receiver over a broadcast link, and
(iii) comprising a tuned channel indicator for a radio channel being received by the radio receiver;
transmitting a unique identifier request to the radio receiver;
receiving a device identifier from the radio receiver that uniquely identifies the radio receiver;
transmitting a refresh time window request to the radio receiver;
receiving a refresh window definition from the radio receiver;
determining a first authentication code, the first authentication code being derived from the device identifier in accordance with a defined algorithm;
transmitting, after the expiration of the refresh time window, the first authentication code from the control device to the radio receiver; and
receiving, in response to transmitting the first authentication code, an enhanced set of metadata, the enhanced set of metadata (i) pertaining to and contemporary with processing performed by the radio receiver, (ii) comprising a song title and artist, and (iii) having been received by the radio receiver over the broadcast radio link.

2. The method according to claim 1, wherein at least one of:
(i) the enhanced set of metadata is more strongly encrypted than the reduced set of metadata, the method further comprising:
determining a decryption code, the decryption code being derived from the device identifier in accordance with a decryption code determination algorithm defined within the radio receiver; and
decrypting the enhanced set of metadata based upon the decryption code,
(ii) displaying on the control device the reduced metadata and the enhanced metadata, and
(iii) the device identifier uniquely identifies the radio receiver within a plurality of radio receivers that are each controllable by the control device, the device identifier indicates reception of at least one of a broadcast activation signal and a broadcast deactivation signal by the plurality of radio receivers, and the broadcast activation signal selectively activates the radio receiver and the broadcast deactivation signal selectively deactivates the radio receiver.

3. The method according to claim 1, wherein the radio receiver comprises a broadcast receiver able to receive and process a wide area broadcast radio signal to produce a selected audio component contained within the wide area broadcast radio signal, and the set of reduced metadata comprises data indicative of at least one of a channel name, channel number and channel category associated with the selected audio component, and the song title and artist describe the selected audio component.

4. The method according to claim 1, further comprising:
transmitting, to the radio receiver, a request for the device identifier, in response to which the receiving the device identifier is performed.

5. The method according to claim 1, further comprising:
receiving, from the radio receiver, a specification of a time window, the time window defining a time period in which to transmit a second authentication code;
transmitting, within the specified time window, the second authentication code to the radio receiver, the second authentication code being derived from the device identifier; and
continuing to receive, in response to the transmitting the second authentication code, the enhanced set of metadata over the connection.

6. The method according to claim 5, further comprising at least one of:
(i) transmitting, to the radio receiver, a request for the specification of the time window; and receiving, in response to transmitting the request for the specification of the time window, the specification of the time window, and
(ii) transmitting, to the radio receiver, a request for an elapsed time signal, the request comprising a specification of time to delay prior to sending the elapsed time signal and the delay based upon the specification of the time window; and
receiving, from the radio receiver, the elapsed time signal, wherein the transmitting the second authentication code to the radio receiver is performed in response to receiving the elapsed time signal.

7. The method according to claim 1, wherein the control device communicates with the radio receiver over at least one of a cable and a short range wireless communications link.

8. The method according to claim 1, further comprising, following receipt of the refresh window definition, and prior to transmitting the first authentication code:
transmitting a request for an elapsed time signal to the radio receiver, the request comprising a specification of time to delay prior to sending the elapsed time signal; and
receiving, after a delay, from the receiver, the elapsed time signal.

9. An automated method on an in-vehicle radio receiver for authenticating a control device, the method comprising:
receiving a broadcast radio signal at a radio receiver in a vehicle, the broadcast radio signal carrying:
data comprising at least one radio channel,
a reduced set of metadata and an enhanced set of metadata, the reduced set of metadata and the enhanced set of metadata pertaining to and being contemporary with processing performed by the radio receiver, the reduced set of metadata comprising a tuned channel indicator of a received radio channel being received by the radio receiver and the enhanced set of metadata comprising a song title and artist and having been received by the radio receiver over the broadcast radio link;
establishing a connection from the radio receiver to a detachable control device in the vehicle, the connection communicating the reduced set of metadata from the radio receiver to the control device; receiving, over the connection, a request for unique device identifier from the control device;
providing, over the connection, a unique device identifier from the radio receiver, the device identifier uniquely identifying the radio receiver;
receiving, over the connection, a received authentication code, said authentication code having been obtained by operating on the unique device identifier using a defined algorithm;
validating the received authentication code based upon the valid authentication code; and
transmitting, in response to validating the received authentication code, the enhanced set of metadata over the connection to the control device.

10. The method according to claim 9, wherein at least one of:
(i) the enhanced set of metadata is more strongly encrypted than the reduced set of metadata, the method further comprising:
determining a decryption code, the decryption code being derived from the device identifier in accordance with a decryption code determination algorithm defined within the radio receiver; and
decrypting the enhanced set of metadata based upon the decryption code,
(ii) the device identifier is a unique device identifier that uniquely identifies the radio receiver within a plurality of radio receivers that are each controllable by the control device, the device identifier indicates reception of at least one of a broadcast activation signal and a broadcast deactivation signal by the plurality of radio receivers, and the broadcast activation signal selectively activates the radio receiver and the broadcast deactivation signal selectively deactivates the radio receiver,
(iii) the radio receiver comprises a broadcast receiver able to receive and process a wide area broadcast radio signal to produce a selected audio component contained within the wide area broadcast radio signal,
the tuned channel indicator is indicative of at least one of a channel name, channel number and channel category associated with the selected audio component, the song title and artist are related to the selected audio component,
(iv) the establishing a connection comprises connecting a cable with a first connector to a second connector affixed to the radio receiver, the first connector communicatively coupled to the control device, and
(v) the control device is detachably coupled to the radio receiver.

11. The method according to claim 9, further comprising receiving, from the control device, a request for the device identifier, and
wherein the providing a device identifier is performed in response to the receiving the request for the device identifier.

12. The method according to claim 9, further comprising:
accepting a request for an elapsed time signal, the request comprising a specification of time to delay prior to sending the elapsed time signal;
delaying for the time to delay; and
transmitting, after the time to delay has elapsed, the elapsed time signal.

13. The method according to claim 12, wherein the transmitting the elapsed time signal is performed over the connection.

14. The method according to claim 9, further comprising:
determining a time window that defines a time period in which to receive a second authentication code;
transmitting a specification of the time window over the connection to the control device;
determining a receipt within the time window of a second authentication code, the second authentication code being derived from the device identifier;
determining, based upon the device identifier, a second valid authentication code;
determining that the received second authentication code equals the second valid authentication code; and
continuing to transmit, in response determining the receipt and to determining that the received second authentication code equals the second valid authentication code, an enhanced set of metadata over the connection.

15. The method according to claim 14, wherein the radio receiver comprises a receiver able to receive and process a wide area broadcast radio signal to produce a selected audio component contained within the wide area broadcast radio signal, and
wherein the time window is based upon a time period of content within the selected audio component.

16. The method according to claim 9, further comprising:
determining a time window that defines a time period in which to receive a second authentication code;
transmitting a specification of the time window over the connection to the control device;
determining a receipt within the time window of a second authentication code, the second authentication code being derived from the device identifier;
determining that the received second authentication code equals the valid authentication code; and
continuing to transmit, in response to determining the receipt and to determining that the received second authentication code equals the valid authentication code, the enhanced set of metadata over the connection.

17. The method according to claim 16, further comprising:
determining a second time window that defines a second time period in which to receive a third authentication code;
transmitting, in response to determining the receipt within the time window of a second authentication code and to determining that the received second authentication code equals the valid authentication code, a specification of the second time window over the connection to the control device;
determining a receipt within the second time window of a third authentication code, the third authentication code being derived from the device identifier;
determining that the received third second authentication code equals the valid authentication code; and
continuing to transmit, in response to determining the receipt within the second time window and to determining that the received third authentication code equals the valid authentication code, the enhanced set of metadata over the connection.

18. The method according to claim 17, wherein the radio receiver comprises a broadcast receiver able to receive and process a wide area broadcast radio signal to produce a selected audio component contained within the wide area broadcast radio signal, wherein the time window and the second time window are independently based upon at least one time period of content within the selected audio component.

19. A machine implemented method in a control device connected to a tunable radio receiving set, said set having a tunable receiver for receiving broadcast audio content and metadata on one of a multiplicity of channels, the tunable receiver controllable by a control device, the method comprising:

transmitting command signals from a control device to a tunable radio receiving set to select one tuned channel for the tunable receiver, the command signals further enabling the tunable receiver to reproduce broadcast audio content received by the tunable receiver;
receiving, from the tunable receiving set, a unique device identifier uniquely identifying the tunable receiving set;
determining, based upon the unique device identifier, an authentication code in accordance with a predefined algorithm;
transmitting a refresh time window request to the tunable radio receiving set;
receiving a refresh window definition from the tunable radio receiving set;
transmitting the authentication code to the tunable receiving set in order to enable the tunable receiving set to communicate broadcast metadata that is received by the tunable receiver and that is descriptive of the audio content received by the tunable receiver;
determining, based upon the device identifier, a decryption code in accordance with a predefined algorithm;
receiving, from the tunable receiving set, reduced broadcast metadata that is descriptive of the selected channel being received by the tunable receiver;
reproducing, without using the decryption code, the reduced broadcast metadata received by the tunable receiver and descriptive of the selected channel;
receiving, from the tunable receiving set, enhanced broadcast metadata that is received by the tunable receiver and that is descriptive of the audio content received by the-tunable receiver;
decrypting, based upon the decryption code, the enhanced broadcast metadata received by the tunable receiver that is descriptive of the audio content received by tunable receiver, said broadcast metadata comprising a song or program title and artist;
and
reproducing the decrypted broadcast metadata received by the tunable receiver that is descriptive of the audio content received by tunable receiver.

20. The method according to claim 19, wherein the audio content received by the tunable receiver is reproduced using at least one audio speaker, and reproducing broadcast metadata includes at least one of:
storing in a memory and displaying on a display.

* * * * *